United States Patent [19]
Burzlaff et al.
[11] Patent Number: 4,484,970
[45] Date of Patent: Nov. 27, 1984

[54] METHOD OF APPLYING DECORATIVE FOIL TO MATERIALS

[75] Inventors: Henry A. Burzlaff; George H. Holoubek, both of Muscatine, Iowa

[73] Assignee: Thatcher Plastic Packaging, Inc., Muscatine, Iowa

[21] Appl. No.: 438,316

[22] Filed: Nov. 1, 1982

[51] Int. Cl.³ .......................... B44C 1/14; B44C 3/00; B32B 31/00

[52] U.S. Cl. .................................... 156/233; 156/234; 156/238; 156/289; 156/235; 156/237

[58] Field of Search ............... 156/230, 289, 233, 234, 156/240, 239, 241, 238, 248, 267, 275.1, 275.5, 247, 235, 237; 101/213, 215, 91, 153; 29/423; 428/914, 202, 200

[56] References Cited

U.S. PATENT DOCUMENTS

| | | | |
|---|---|---|---|
| 3,592,722 | 7/1971 | Morgan | 156/234 |
| 3,753,850 | 8/1973 | Brunet | 156/234 |
| 3,894,167 | 6/1975 | Kluge et al. | 156/233 |
| 4,012,552 | 3/1977 | Watts | 428/914 |
| 4,017,581 | 4/1977 | Amidon | 156/234 |
| 4,053,344 | 10/1977 | Hirahara | 156/247 |
| 4,196,033 | 4/1980 | Arai et al. | 156/289 |
| 4,225,641 | 9/1980 | Yokomizo | 156/234 |
| 4,388,137 | 6/1983 | McCarty et al. | 156/289 |

*Primary Examiner*—Edward Kimlin
*Assistant Examiner*—Louis Falasco
*Attorney, Agent, or Firm*—Parmelee, Miller, Welsh & Kratz

[57] ABSTRACT

A desired decorative design on packaging such as tubes is made up of a combination of printed matter and a decorative foil such as a metal, pigmented or textured pattern foil. The method involves the steps of first applying the printed matter to the material with an ink treated to prevent adherence of the foil to the printed matter. Thereafter, the foil coated with an adhesive is positioned against the material and heat and/or pressure applied so that a foil transfer will occur onto all areas of the material engaged by the foil that are devoid of the printed matter. The foil is applied with a smooth continuous silicone pad. Exact registration is assured and the use of complicated die designs is wholly avoided.

11 Claims, 5 Drawing Figures

METHOD OF APPLYING DECORATIVE FOIL TO MATERIALS

FIELD OF THE INVENTION

This invention relates generally to providing decorative designs and printed matter on materials and has particular application to an improved method of applying printed matter and a decorative foil to contiguous portions of packaging material with the printed matter and decorative foil design in proper registration. By decorative foil is meant metal, and pigmented foils which may be textured or patterned.

BACKGROUND OF THE INVENTION

The decorative effect of packaging can be greatly enhanced by the use of decorative foil in combination with the printed matter. The decorative foil provides a lustrous, elegant quality to the package.

Various techniques have been used to apply decorative foil to packaging. The most popular method is hot stamping, also known as dry printing. Typically, hot stamping involves the use of a roll leaf foil which includes a sheet of a polymeric carrier such as polyester, acetate or cellophane. A release coating such as a wax is applied to the carrier, a lacquer or varnish is overlayed for resistance, a metal is vacuum-deposited or a pigmented vehicle is roller painted onto the coated carrier, and an adhesive coating is applied to the metal or pigmented layer. The foil is placed against the object to be imprinted and a die is pressed against the foil to transfer portions of the metal or pigmented layer corresponding to the pattern on the die onto the object, either by pressure or heat and pressure. If an ink design is desired on the same object, it can be placed on the object either before or after the foil pattern. In either case, very careful registration is required to ensure proper alignment of the foil and ink patterns.

Another transfer method involves imprinting onto the object, the desired pattern in an adhesive, and then pressing an adhesive-free foil against the adhesive pattern to imprint the foil pattern. As with the first method, if an ink design is desired in addition to the foil design, careful registration is required to align the ink and foil images produced in separate operations.

A third method of applying a foil pattern involves applying a reverse pattern in ink to a temporary carrier then applying a different reverse pattern in clear adhesive, pressing an adhesive-free foil against the temporary carrier, overlaying an adhesive and impressing the resulting sandwich against the object to form the foil pattern. In this method, too, the adhesive and ink designs are applied separately and thus must be carefully registered onto the temporary carrier to accomplish proper assignment of the ink and foil images.

The prior art methods suffer from several disadvantages. Since foil and ink are impressed in separate steps, careful registration is required to align the patterns. Registration is especially difficult with cylindrical and other non-flat surfaces, such as bottles and tubes. Most methods require the use of dies which have a raised image corresponding to the desired pattern. The step of pressing a metal die against a delicate foil is very sensitive and can damage the metallic or pigmented transfer or the receiving material, thus detracting from the appearance of the final article.

What has been needed, but not shown by the prior art, is a simple and economical method of placing an ink and decorative foil onto an object, without the necessity of raised image dies which can harm the object. The method of this invention satisfies this need.

SUMMARY OF THE INVENTION

The present invention embodies a greatly improved method of applying ink and decorative foil to materials. The method comprises first, applying ink in a desired pattern to a material, such as for example, a plastic squeeze tube. The design is printed onto the material using a curable ink containing suitable release agents which prevent the transfer of the adhesive and metallic or pigmented portion of the hot stamping foil onto the printed areas of the basic material, e.g., the plastic squeeze tube. The ink is then cured, preferably by ultraviolet light, to form an inked pattern on the material. Next, the adhesive-coated decorative foil is contacted with the inked material to adhere the foil to the ink-free portions of the material. The contacting conditions depend on the type of adhesive used. The foil is then removed from the portions of the material to which it does not adhere, i.e., the inked portions, to form an article with an ink design and with a metallic or pigmented overlay on the ink-free portions of the article.

The method of this invention poses no registration problems, and requires no patterned die plate.

DETAILED DESCRIPTION OF THE INVENTION

Figure 1:
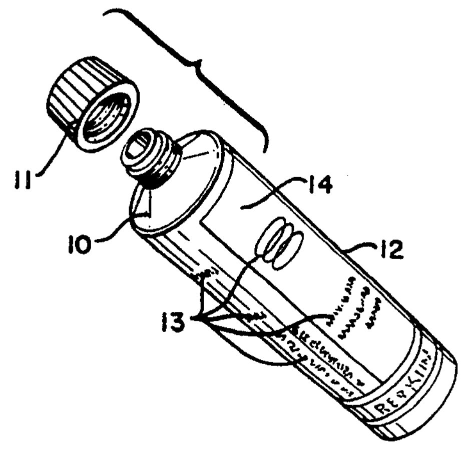
FIG. 1 is a perspective view of a cosmetic tube having printed matter on its exterior, together with metallic foil covering those areas not covered by printed matter, representing one example of the resulting product provided by the method of this invention.

Referring first to FIG. 1, there is shown a typical plastic container such as a polyolefin or polystyrene tube 10 which might contain lipstick, shampoo or the like. Cap 11 is shown exploded away from the top of the tube 10. The exterior wall 12 of the tube in turn is provided with a decorative design made up of printed matter indicated generally at 13 and a decorative foil such as a metallic foil indicated at 14.

The present invention is concerned with an improved method for providing the combination of the printed matter and decorative foil on the tube 10 as shown in FIG. 1.

Figure 2:
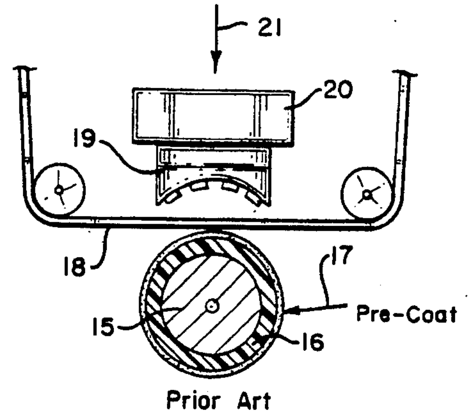
Prior Art FIG. 2
FIG. 2 is a diagram showing one type of hot stamping operation characteristic of the prior art for applying metallic foil to a tube.

Considering now prior art methods for applying foil, reference is first made to FIG. 2 which shows a mandrel 15 for supporting a tube 16.

A metal foil 18 having a thermoplastic adhesive layer is urged into an arcuate configuration by an appropriate die 19 heated by a heat block 20 and moved downwardly to press the foil 18 against the tube 16 covered previously with a protective coating layer 17. The die 19 has a raised design and is curved to conform to the circumference of the tube 16 so that the die design will press the metallic portions of the foil 18 onto those areas of the tube 16 to receive such metallic portions. The adhesive layer of the foil is activated by the heat from the heat block 20 to adhere the foil 18 to the coated surface 17 of the tube 16. The appropriate pressure applied on the die 19 is indicated by the arrow 21 in FIG. 2.

Figure 3:
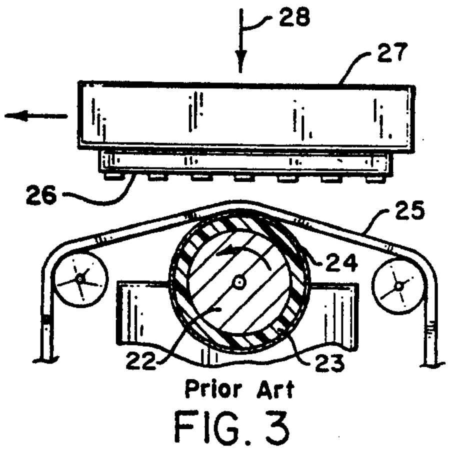
Prior Art FIG. 3
FIG. 3 is a diagram showing another embodiment of a typical prior art method of hot stamping metal foil onto a tube.

FIG. 3 shows a similar system except that the mandrel shown at 22 is rotatably mounted for supporting a tube 23. In this embodiment, the metallic foil 25 having a thermoplastic adhesive layer will again engage the tube. The die 26 has a planar underside with the appropriate raised design and is arranged to move transversely after being lowered onto the foil so that the tube will rotate as indicated by the arrow and thereby enable a transfer to take place over the desired portion to the coated surface 24 of the plastic tube 23.

In FIG. 3, the die 26 is heated by a heat block 27 and the downward pressure is indicated by the arrow 28.

Figure 4:
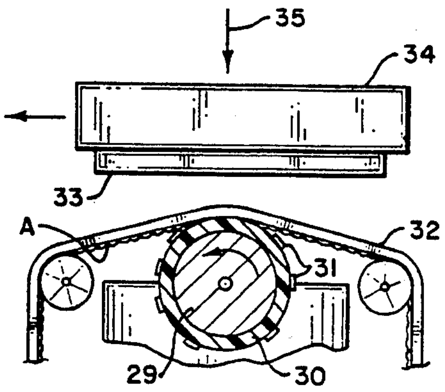
FIG. 4 is a diagram showing the method of the present invention for applying metal foil to a tube.

Referring now to FIG. 4, showing one embodiment of this invention, the method of the present invention will be discussed. In FIG. 4, there is again provided a rotatable mandrel 29 for supporting a tube 30. Tube 30 is first provided with printed matter 31 on its exterior wall.

The printed matter 31, which may include lettering, designs or even color printing of whole areas of the tube, is disposed on the tube 30 using an ink or inks having one or more additives to prevent transfer of any portions of the metal foil 32 and adhesive A onto the printed matter 31. The additives function as release agents which prevent a bond from forming between the printed matter 31 and the adhesive A disposed on the metal foil 32. The ink, containing release agent additives, is cured on the tube 30 to form printed matter 31. Once cured, the ink adheres to the tube 30 but does not permit the thermoplastic adhesive A or the foil 32 to adhere to the inked surface.

Examples of suitable inks are ultraviolet cured inks such as those produced by the Inmont Corporation, Ultra King inks and Sun Chemical's Suncure System inks. The additives which prevent the foil from adhering to the printed matter can comprise silicones, waxes, fluorocarbons or other substances known to be release agents. Such additives are well known in the extrusion and molding industry. The determination of the most suitable release agent additive, and the appropriate amount of such additive, is well within the skill of one generally familiar with the printing art. The ink can be applied to the tube or other items in any conventional or otherwise convenient manner, such as by letter press, offset, rotogravure, or flexographic press. It is preferred that the ink or inks used be curable rapidly, as by exposure to an ultraviolet light source, to provide a cured ink impression which is thermally stable under the heat and/or heat and pressure applied in the hot stamping process.

The ink must be dry enough after cure such that the metal foil 32 bearing adhesive A can be contacted with the printed matter 31 without smearing the printed matter 31. After the ink has been cured to form printed matter 31, the tube 30 bearing printed matter 31 is contacted with a metal foil bearing an adhesive A. The metal foil 32 is typically a metal of any desired type applied to a carrier by foil lamination or vapor deposition by vacuum metalizing, electron gun or cathode deposition. The most common metal foils use aluminum deposits under vacuum. The carrier typically is a smooth polymeric film such as cellulose or polyester coated on one surface with a release layer on which is then disposed the metal.

The adhesive A can be any convenient thermoplastic adhesive which can exist in a dry or plastic state on the metal foil 32 and which is capable of bonding with the tube 30 but not with the printed matter containing release agents.

An especially convenient method of contacting the metal foil 32 to the tube 30 and adhering the foil 32 to the tube is shown in FIG. 4. The metal foil 32 is positioned against the tube 30 which is mounted on a rotatable mandrel 29. A smooth, unembossed planar surface 33 heated by heat block 34 is used to apply heat and pressure in the direction 35 to the metal foil 32. As the tube 30 rotates on the mandrel 29, the smooth surface 33 remains in contact with the foil 32 to contact the foil 32 over the desired portion of the tube 30. The smooth unembossed surface 33 moves with the foil 32 so there exists no relative movement between surface 33 and foil 32 in the direction of movement of the foil 32 while foil 32 is in contact with the tube 30. It is preferred that smooth, unembossed surface 33 be of metal or a resilient material such as a rubber. Especially preferred is a silicone rubber.

The amount of heat 34 and pressure 35 required for satisfactory bonding of the metal foil 32 to the tube 30, and the speed of rotation of tube 30, are determined by the type of adhesive A selected.

After contacting the tube 30 and printing matter 31 with the metal foil 32, the metal foil 32 is removed from contact with the printed matter 31. The metal foil 32 adheres to the unprinted portions of the tube 30, but does not adhere to the printed matter 31 containing the release agent. As the metal foil 32 is in contact with the tube 30 bearing the printed matter 31, the metal foil ruptures at the juncture of the printed matter 31 and the surface of the tube 30, leaving portions of the metal foil 32 bonded to the portions of the tube 30 which do not bear printed matter. The resulting article has portions bearing printed matter and other portions bearing metal foil both of which are placed in the desired pattern.

In a separate operation the entire tube 30 with printed matter 31 and the metal foil 32 which was transferred to the tube may be covered with a suitable transparent coating such as a polyester or epoxy coating to protect the tube print and metal foil from subsequent abrasion.

Figure 5:
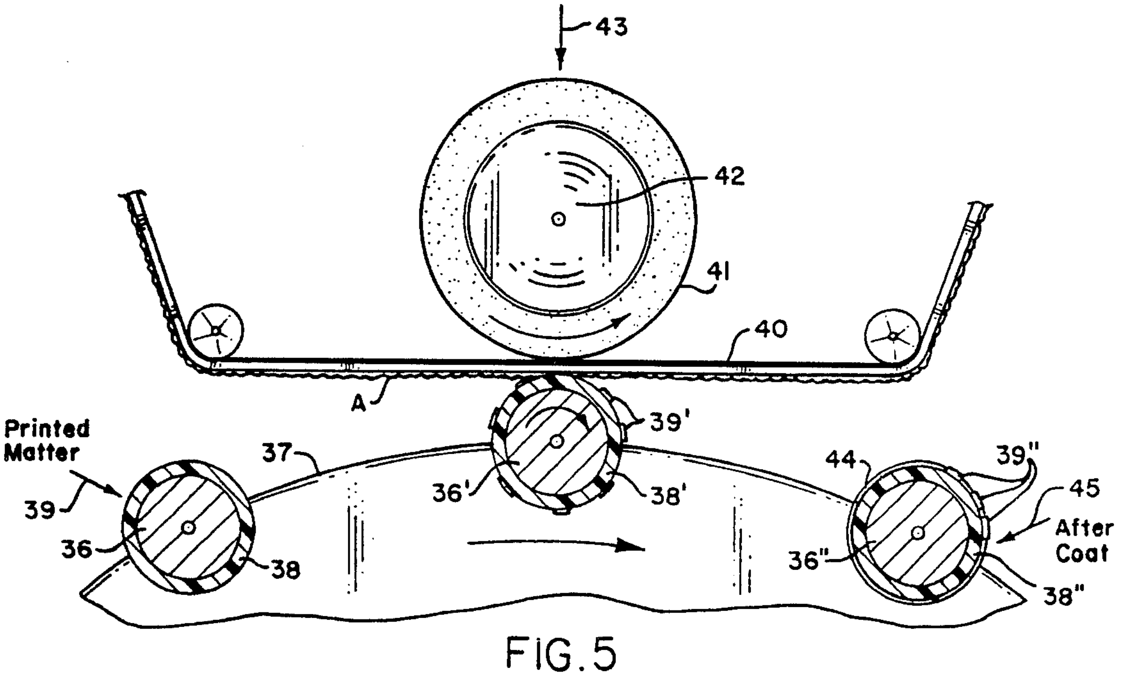
FIG. 5 is a diagram showing a more comprehensive system for applying metal foil to the tube according to the invention.

FIG. 5 illustrates a second embodiment of the method of this invention. A cylindrical roller 42 having a smooth, unembossed surface 41 may be used similarly to the smooth, unembossed planar surface 33 of FIG. 4. There is shown to the left a rotatable mandrel 36 mounted on a carrier 37. Mandrel 36 supports a tube 38. Printed matter is placed on the tube 38 as indicated by the arrow 39, the ink used for this printed matter 39 being treated with additives to prevent any transfer to metallic portions of the foil as described in conjunction with FIG. 4.

After the printed matter has been applied and cured in the embodiment of FIG. 5, The large carrier 37 rotates to position the mandrel 36 to a new position shown in FIG. 5 at 36'. The tube 38 with the printed matter 39 thereon is similarly indicated by the numerals 38' and 39'. In this position in FIG. 5, the carrier 37 is stopped. The metallic foil 40 having an adhesive layer A is then pressed into engagement with the tube 38' by a continuous, smooth, unembossed peripheral surface 41 formed on a cylinder 42. Cylinder 42 can be heated to function as a heat block. The arrow 43 indicates pressure exerted by the periphery 41 of the cylinder on the foil 40.

With the foregoing arrangement, both the cylinder 42 and the mandrel 36' rotate as indicated by the arrows so that the foil 40 transfers its metallic portion to the external wall of the tube 38' as described in conjunction with FIG. 4.

After the metallic foil has been applied over the desired portion of the tube 38', the table carrier 37 is again rotated to shift the mandrel 36' and tube 38' to a third position shown at the right at 36'' and 38''. Also shown is the printed material at 39'' and the transferred metallic foil portions at 44.

In this position a protective coating 45 of epoxy type resins is placed on the tube, covering the entire periphery of tube 38'' and over the previously printed design 39'' and metallic foil 44 impressed on the unprinted portion of the tube 38''. The epoxy coating is then cured, preferably by passing the entire tube under an ultraviolet light source.

While the specific examples described in connection with FIGS. 4 and 5 are directed to methods for applying metal foil to plastic squeeze tubes, it is to be understood that the methods described can be utilized in hot stamping other kinds of foils such as wood grained and pigmented foils or other pattern foils to all sorts of packaging forms and to other materials in addition to plastic such as either coated or uncoated paper and paperboard. The metal foils are available in textured as well as smooth finishes while the pigmented foils come in gloss and matte finishes. It is to be further understood, that the invention is not limited to use in connection with packaging materials, but has broad application and can be used wherever it is desired to apply foils and printed matter to materials in perfect registration.

From all of the foregoing, it will now be evident that the present invention has provided a greatly improved method for applying decorative foil to materials wherein certain disadvantages associated with prior art systems are avoided.

It is understood that the foregoing descriptions are for the purpose of illustration and that the invention includes modifications and equivalents within the scope of the appended claims.

We claim:

1. A method of applying decorative foil coated with an adhesive and ink to a material to produce an article having portions bearing ink and other portions bearing said decorative foil, comprising:

applying ink in a desired pattern to the material to form an inked material having an ink-bearing and an ink-free portion, said ink having therein, a releasing agent which prevents the adhesive coating on said decorative foil from adhering to the said ink;

curing said ink;

disposing said decorative foil with the adhesive coating adjacent to said inked material;

contacting both the ink-bearing and ink-free portions of said inked material with said adhesive coated decorative foil at a temperature and pressure which causes said adhesive to bond said decorative foil to said ink-free portion of said inked material but not to said ink-bearing portion; and removing said decorative foil from contact with said ink-bearing portion of said inked material, whereby is created an article having portions bearing said decorative foil and having adjacent portions in perfect registration therewith free of said decorative foil and bearing ink in said desired pattern.

2. The method of claim 1 wherein said decorative foil is selected from a group consisting of a metal foil, a pigmented foil and patterned foil.

3. The method of claim 2 wherein said releasing agent is selected from a group consisting of a wax, a silicone and a fluorocarbon.

4. The method of claim 2 wherein said adhesive is a thermoplastic.

5. The method of claim 2 wherein said ink can be cured by exposure to ultraviolet light.

6. The method of claim 2 wherein said decorative foil is contacted with said inked material by pressing said decorative foil between said inked material and a smooth, unembossed surface.

7. The method of claim 6 wherein said smooth, unembossed surface is formed by a material selected from a group consisting of rubber and metal.

8. The method of claim 1 wherein the inked material including the decorative foil covered portion is covered with a protective transparent coating to reduce abrasion and damage to the decorative foil and the inked design.

9. The method of claim 8 wherein said protective transparent coating is selected from a group consisting of a polyester and an epoxy.

10. The method of claim 1 wherein the material to which said ink and decorative foil are applied is selected from a group consisting of thermoplastic, paper, paperboard, coated paper and coated paperboard.

11. The method of claim 10 wherein said material to which said ink and decorative foil are applied is selected from a thermoplastic consisting of a polyolefin and a polystyrene.

* * * * *